US010132923B2

(12) United States Patent
Robin

(10) Patent No.: US 10,132,923 B2
(45) Date of Patent: Nov. 20, 2018

(54) METHOD FOR CONTROLLING TRANSMISSION POWER AND AIRCRAFT ANTI-COLLISION SYSTEM FOR IMPLEMENTING SUCH A METHOD

(71) Applicant: Airbus Operations SAS, Toulouse (FR)

(72) Inventor: Jean-Luc Robin, Saint-jean (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/735,512

(22) PCT Filed: Jun. 9, 2016

(86) PCT No.: PCT/EP2016/063096
§ 371 (c)(1),
(2) Date: Dec. 11, 2017

(87) PCT Pub. No.: WO2016/198492
PCT Pub. Date: Dec. 15, 2016

(65) Prior Publication Data
US 2018/0156912 A1      Jun. 7, 2018

(30) Foreign Application Priority Data

Jun. 10, 2015    (FR) .................................... 15 55276

(51) Int. Cl.
*G01S 13/76* (2006.01)
*G01S 7/282* (2006.01)
(Continued)

(52) U.S. Cl.
CPC ............ *G01S 13/765* (2013.01); *G01S 7/282* (2013.01); *G01S 13/9303* (2013.01); *G01S 2007/4013* (2013.01)

(58) Field of Classification Search
CPC ............................... G01S 13/765; G01S 7/282
(Continued)

(56) References Cited

U.S. PATENT DOCUMENTS 5,471,212 A * 11/1995 Sharpe .................... G01S 13/74
                                                        342/42
5,959,568 A *  9/1999 Woolley ................ G01S 5/0289
                                                        235/385
(Continued)

OTHER PUBLICATIONS

International Search Report, dated Sep. 2, 2016, priority document.
(Continued)

*Primary Examiner* — Marcus E Windrich
(74) *Attorney, Agent, or Firm* — Greer, Burns & Crain, Ltd.

(57) ABSTRACT

A method and system for controlling the transmission of power of request-response messages implemented by a system to prevent collisions between a first aircraft and a second aircraft. The method comprises measuring at least the value, referred to as the quality value, of a quantity representative of the reception quality of the transponder of the second aircraft and, implemented by the anti-collision device of the first aircraft, and a control step to control the transmission power of the radio-frequency signals carrying the request-response messages according to the quality value or values contained in the response messages sent by the transponder.

14 Claims, 6 Drawing Sheets

(51) Int. Cl.
*G01S 13/93* (2006.01)
*G01S 7/40* (2006.01)

(58) Field of Classification Search
USPC .............................................. 342/29, 30, 42
See application file for complete search history.

(56) References Cited

U.S. PATENT DOCUMENTS

| | | | | |
|---|---|---|---|---|
| 2002/0063653 | A1* | 5/2002 | Oey | G01S 13/765 |
| | | | | 342/29 |
| 2002/0153996 | A1* | 10/2002 | Chan | G01S 5/0009 |
| | | | | 340/10.4 |
| 2003/0137444 | A1 | 7/2003 | stone et al. | |
| 2005/0231418 | A1* | 10/2005 | Ybarra | G08G 5/0008 |
| | | | | 342/29 |
| 2008/0311865 | A1* | 12/2008 | Worfolk | H04W 52/225 |
| | | | | 455/115.1 |
| 2010/0029317 | A1* | 2/2010 | Budampati | H04W 52/08 |
| | | | | 455/522 |
| 2012/0163418 | A1* | 6/2012 | Ward | G01S 5/14 |
| | | | | 375/141 |

OTHER PUBLICATIONS

"Introduction to TCAS II, Version 7.1", Feb. 28, 2011 (http://www.faa.gov/documentLibrary/media/Advisory_Circular/TCAS II V7.1 Intro booklet.pdf).

\* cited by examiner

METHOD FOR CONTROLLING TRANSMISSION POWER AND AIRCRAFT ANTI-COLLISION SYSTEM FOR IMPLEMENTING SUCH A METHOD

CROSS-REFERENCES TO RELATED APPLICATIONS

This application claims the benefit of the French patent application No. 1555276 filed on Jun. 10, 2015, the entire disclosures of which are incorporated herein by way of reference.

BACKGROUND OF THE INVENTION

The present invention relates to a method for controlling the transmission power of response request messages carried out by a system for avoiding the collision of a first aircraft and a second aircraft, and such a system for avoiding the collision of aircraft.

The field of the present invention is that of systems for avoiding aircraft collisions and more particularly a known system called TCAS (Traffic Alert and Collision Avoidance System). Such a system can operate in accordance with a plurality of modes, in particular, a so-called C/A mode and an S mode. The present invention is adapted to the operation of the system in the S mode thereof.

Only for reasons of convenience, such a system is referred to in the present description as an anti-collision system. Any aircraft which uses such an anti-collision system is fitted, on the one hand, with a TCAS apparatus, the name of which is generally confused with that of the system and which is referred to in the present description, also for reasons of convenience, as an anti-collision apparatus and, on the other hand, with a transponder which can be used for other functions which do not relate directly to the present invention and which are not described for this reason.

The operation of such an anti-collision system in the S mode mentioned above is illustrated in FIG. 1. Any aircraft transmits at regular intervals beacon signals Sq referred to as "squitters" which particularly contain an address of the transmitting aircraft. When the anti-collision apparatus of an aircraft 1 receives such a signal Sq from another aircraft 2, it transmits a response request message Req towards the aircraft 2. Upon receipt of this message Req, the transponder of the aircraft 2 transmits a response Rep which, upon receipt by the anti-collision apparatus of the aircraft 1, is used by the apparatus to determine the distance which separates the aircraft 1 from the aircraft 2 (distance referred to as the Range), the relative speed (Range rate) between the two aircraft, the estimated time before a possible collision (Tau) and the angle between the heading of the aircraft 1 and the direction of the aircraft 2, further called the Bearing, etc. On the basis of the content of this response, the anti-collision apparatus of the aircraft 1 decides whether or not to continue this preliminary surveillance phase with a tracking phase of the aircraft 2 which is now referred to as being an "intruder". If this is the case, response request messages Req are transmitted at regular time intervals by the aircraft 1 towards the intruder aircraft 2, to which the aircraft 2 replies with response messages Rep. The responses provided by the intruder aircraft 2 allow the anti-collision apparatus of the aircraft 1 to predict a possible collision and in particular to emit warnings, such as Traffic Advisories (TAs) and/or Resolution Advisories (RAs).

In order to transmit the respective messages thereof, in particular the messages Req and Rep, the anti-collision apparatus and the transponders of a TCAS anti-collision system use frequency bands of 1030 MHz and 1090 MHz. The transponders are used, as well as for the TCAS anti-collision system, for the secondary radar system SSR (Secondary Surveillance Radar) in order to reply to the requests therefrom in accordance with the same mechanism as for the TCAS anti-collision system. Furthermore, the DME signals (measurement of the oblique distance) are also transmitted in the same frequency bands. The various uses of these frequency bands may bring about interference between radiofrequency signals which disrupts the operation of the whole of these systems. Furthermore, as a result of the increase in the density of the traffic of aircraft and the increase in the quantity of information transmitted by these different systems, occurrences of interference between radiofrequency signals transmitted in the frequency bands mentioned above are more and more frequent and one of the problems raised by the TCAS anti-collision systems is to reduce these occurrences of interference as much as possible.

To this end, two known methods are proposed by the standard known as MOPS (Minimum Operational Performance Standards) DO-185B in relation to the systems for avoiding collisions and warning about TCAS traffic. They each involve acting on the power of transmission by the aircraft 1 of the response request messages Req towards the so-called intruder aircraft during the tracking phase mentioned above.

The first method, known as power programming in the standard DO-185B, involves transmitting these request messages Req at a transmission power Pt reduced in relation to a predetermined maximum power Pmax, even more so when the intruder aircraft 2 is near the aircraft 1 in question. This transmission power Pt is expressed in accordance with the following formula:

$$Pt = P\max + 20 \log(r/10),$$

where r is the distance (also referred to as the range) expressed in nautical miles, between the aircraft 1 in question and the intruder aircraft 2. The power Pmax is, for example, 250 Watt. This formula is applied only when the distance r (range) is less than 10 nautical miles.

It may be noted that this formula is arbitrary and that the transmission power Pt calculated in this manner depends only on the distance r between the two aircraft 1 and 2. Now, it has been found that, in practice, this formula leads to transmission powers Pt of the request messages Req which are still quite high and zones Z which are covered in this manner by the transmitted radiofrequency signals which are too extensive, which results in the number of aircraft which transmit in these zones Z still being too great. This also results in this so-called power programming method not leading, when the density of the air traffic is great, to an overall decrease of the occupation of the frequency bands used and to a reduction of the interference mentioned above.

The second method recommended by the standard DO-185B is known as an interference limiting method which involves reducing the transmission power of the request messages Req only in accordance with the number of intruder aircraft which surround the aircraft in question. The major disadvantage of this method is that, when the density of the air traffic becomes very great, the transmission power Pt may be considerably reduced so that intruder aircraft no longer receive the request messages Req and therefore no longer reply thereto. Therefore, they are no longer tracked by the anti-collision apparatus of the TCAS system.

SUMMARY OF THE INVENTION

An object of the present invention is therefore to provide a method for controlling the transmission power of response request messages carried out by a system for preventing the collision of a first aircraft and a second aircraft, the system being of the type comprising an anti-collision apparatus with which the first aircraft is provided and a transponder with which the second aircraft is provided. The method comprises the following steps which are carried out by the anti-collision apparatus:
- a step of transmitting request messages in the form of radiofrequency signals which carry the messages and
- a step of receiving radiofrequency signals which carry response messages which are transmitted by the transponder in response to the request messages.

It further comprises the following steps which are carried out by the transponder:
- a step of receiving the radiofrequency signals which carry request messages which are transmitted by the anti-collision apparatus and
- a step of transmitting the radiofrequency signals which carry response messages in response to request messages.

According to the present invention, the method comprises, carried out by the transponder, a measuring step for measuring at least the value, referred to as the quality value, of a variable which represents the quality of reception by the reception channel of the radiofrequency signals which carry request messages transmitted by an anti-collision apparatus and a step of encapsulating data which represent the quality value(s) in the response message and, carried out by the anti-collision apparatus, a control step for controlling the transmission power of the radiofrequency signals which carry the request messages in accordance with the quality value(s) which is/are encapsulated in the response messages which are transmitted by the transponder.

BRIEF DESCRIPTION OF THE DRAWINGS

The features of the invention mentioned above and others will become more clearly apparent from reading the following description of an embodiment, the description being given in relation to the appended drawings, in which.

DETAILED DESCRIPTION OF THE PREFERRED EMBODIMENTS

Figure 1:
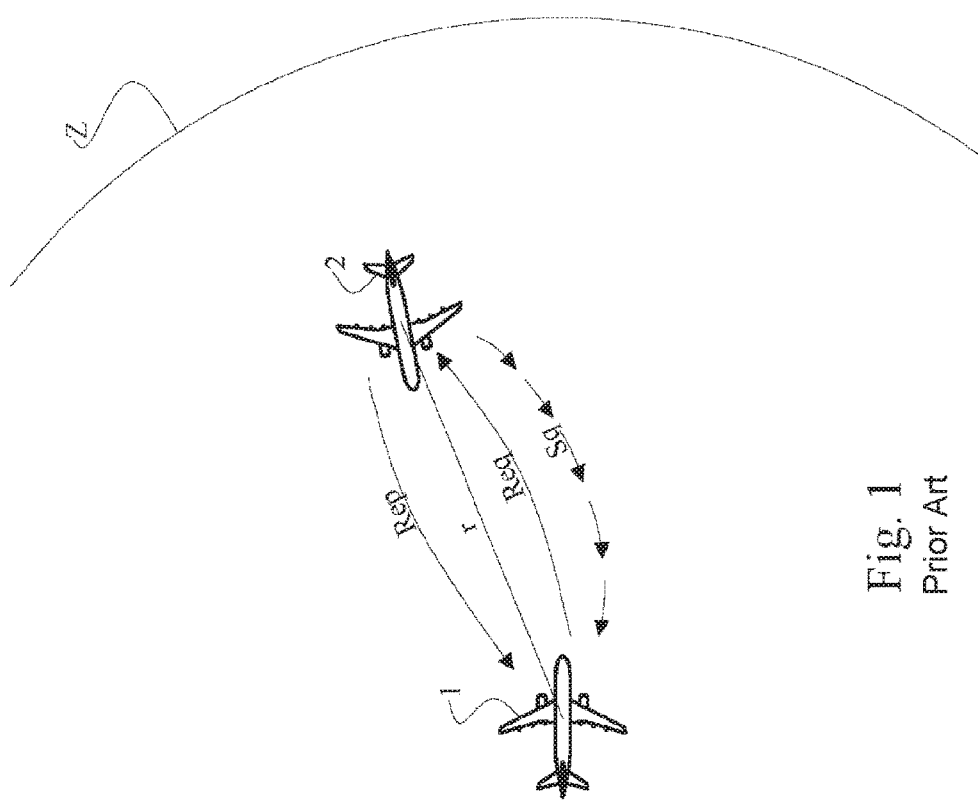
FIG. 1 is a view illustrating the operation of an anti-collision system.
Figure 2:
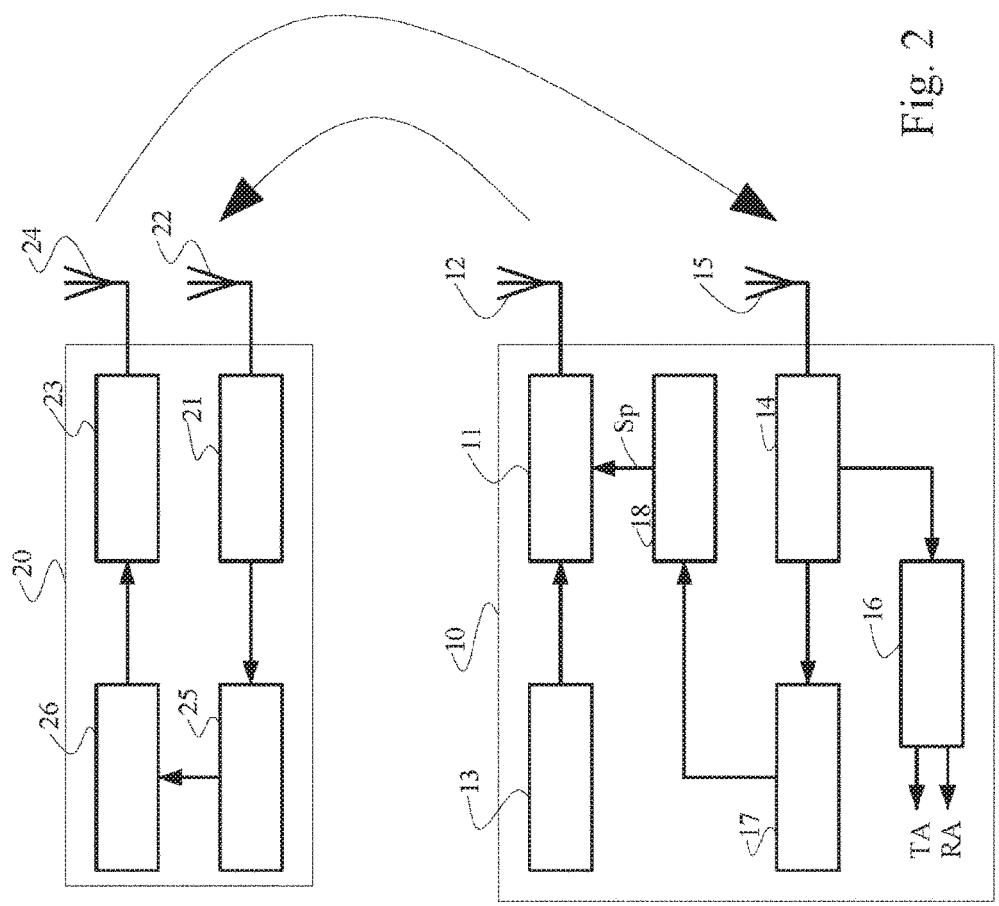
FIG. 2 is a schematic diagram of an anti-collision system according to an embodiment of the present invention, including an anti-collision apparatus and a transponder.

FIG. 2 illustrates a system for preventing aircraft collisions according to an embodiment of the present invention, referred to here as an anti-collision system, for example, of the TCAS type, which comprises, on the one hand, an anti-collision apparatus 10 which is fitted to a first aircraft, such as the aircraft 1 of FIG. 1, and, on the other hand, a transponder 20 which is fitted to a second aircraft, such as the intruder aircraft 2 of FIG. 1. In FIG. 2, the anti-collision apparatus 10 and the transponder 20 are in communication with each other. It will be understood that any aircraft generally comprises, at the same time, an anti-collision system 10 and a transponder 20.

The anti-collision apparatus 10 substantially comprises a transmission channel 11, with the antenna 12 thereof, which are provided to transmit radiofrequency signals which carry response request messages Req which are supplied thereto by a unit 13 for processing such messages. It also comprises a receiver 14, with the antenna 15 thereof, which are provided to receive the radiofrequency signals which carry response messages Rep which are transmitted by the transponder 20 in response to request messages Req previously transmitted by the anti-collision apparatus 10. The receiver 14 is connected to a unit 16 for analyzing the response messages Rep which is provided to supply, as is known per se, Traffic Advisories TAs or Resolution Advisories RAs.

With regard to the transponder 20, it substantially comprises a reception channel 21, with the antenna 22 thereof, for receiving the radiofrequency signals which are transmitted by the transmission channel 11 of an anti-collision apparatus 10 and to recover the request messages Req which the received radiofrequency signals carry. It further comprises a transmitter 23, and an antenna 24, for transmitting radiofrequency signals which carry response messages Rep towards the anti-collision apparatus 10 which has transmitted the request message Req which is recovered by the reception channel 21.

For example, the radiofrequency signals which are transmitted by the transmission channel 11 have a frequency of 1030 MHz while those transmitted by the transmitter 23 have a frequency of 1090 MHz.

According to the invention, a transponder 20 further comprises a measuring unit 25 for measuring the quality of the radiofrequency signals received by the reception channel 21 and a unit 26 for encapsulating the data in relation to the quality value(s) Q which is/are measured by the measuring unit 25 in the response message Rep to be transmitted by the transmitter 23 to the anti-collision apparatus 10 which has transmitted the request message Req received.

With regard to the anti-collision apparatus 10, it further comprises a decapsulation unit 17 for recovering the data in relation to the quality value(s) Q which is/are measured by the measuring unit 25 and for controlling a control unit 18 which is itself provided to control the transmission power Pt of the transmission channel 11.

The control unit 18 processes, on the basis of the data received from the decapsulation unit 17, a control signal Sp for increasing or decreasing the transmission power Pt of the transmission channel 11.

In this manner, the anti-collision apparatus 10 transmits, via the transmission channel 11 thereof, radiofrequency signals which carry a request message Req towards a transponder 20 which receives these radiofrequency signals via the reception channel 21 thereof and which measures the quality value(s) Q thereof via the measuring unit 25 thereof. The quality value(s) Q measured in this manner are encapsulated in the form of data in the response message Rep to the request message Req previously received and this message Rep is transmitted via the transmission channel 23 in the form of radiofrequency signals to the anti-collision apparatus 10. It receives these radiofrequency signals via the receiver 14 thereof, decapsulates via the decapsulation unit 17 thereof the data contained in the response message Rep received and extracts therefrom the measured quality value(s) Q which is/are represented by these data. The control unit 18 processes the control signal Sp in the following manner If the quality value(s) measured by the measuring unit 25 is/are representative of a low quality, that is to say, less than one or more threshold quality value(s), the control signal Sp is such that the transmission power Pt is increased in relation to the preceding transmission, for example by a predetermined incremental value or a value in accordance with the quality value(s) measured or else by a value in accordance with the difference between the measured value(s) and one or more threshold value(s). Conversely, if the quality value(s) measured by the measuring unit 25 are representative of a good quality, that is to say, greater than one or more threshold quality value(s), the control signal Sp is such that the transmission power Pt is reduced in relation to the preceding transmission, for example by a predetermined decremental value, by a value in accordance with the quality value(s) measured or by a value in accordance with the difference between the measured value(s) and one or more threshold value(s).

According to another embodiment, the quality value of the radiofrequency signal measured by the measuring unit 24 is the value of at least one of the following characteristics:

the reception power Pr of the radiofrequency signals which carry a request message Req received by the reception channel 21, the signal-to-noise ratio S/N of the radiofrequency signal which carries a request message Req received by the reception channel 21, the bit error rate BER of the radiofrequency signal which carries a request message Req received by the reception channel 21.

According to an embodiment of the invention, the quality of the radiofrequency signal measured by the measuring unit 25 is the reception power Pr of the radiofrequency signals which carry a request message Req received by the reception channel 21. Thus, if the measured value of the reception power Pr is less than a threshold power value Ps, the control signal Sp is such that the transmission power Pt is increased, for example by a predetermined incremental value, by a value in accordance with the measured reception power Pr or by a value in accordance with the difference Pr−Ps. Conversely, if the measured value of the reception power Pr is greater than a threshold power Ps, the control signal Sp is such that the transmission power Pt is reduced, for example by a predetermined decremental value, by a value in accordance with the measured reception power Pr or by a value in accordance with the difference Pr−Ps.

According to another embodiment of the invention, the quality of the radiofrequency signal measured by the measuring unit 24 is the signal-to-noise ratio S/N of the radiofrequency signal which carries a request message Req received by the reception channel 21. Thus, if the measured value of the ratio S/N is less than a threshold value S/Ns, the control signal Sp is such that the transmission power Pt is increased and, conversely, if the measured value is greater than the threshold value S/Ns, the control signal Sp is such that the transmission power Pt is decreased.

According to another embodiment of the invention, the quality of the radiofrequency signal measured by the measuring unit 24 is the bit error rate BER of the radiofrequency signal which carries a request message Req as received and decoded by the reception channel 21. Thus, if the measured value of the bit error rate is less than a threshold value BERs, the control signal Sp is such that the transmission power Pt is reduced and, conversely, if the measured value is greater than the threshold value BERs, the control signal Sp is such that the transmission power Pt is increased.

Figure 3:
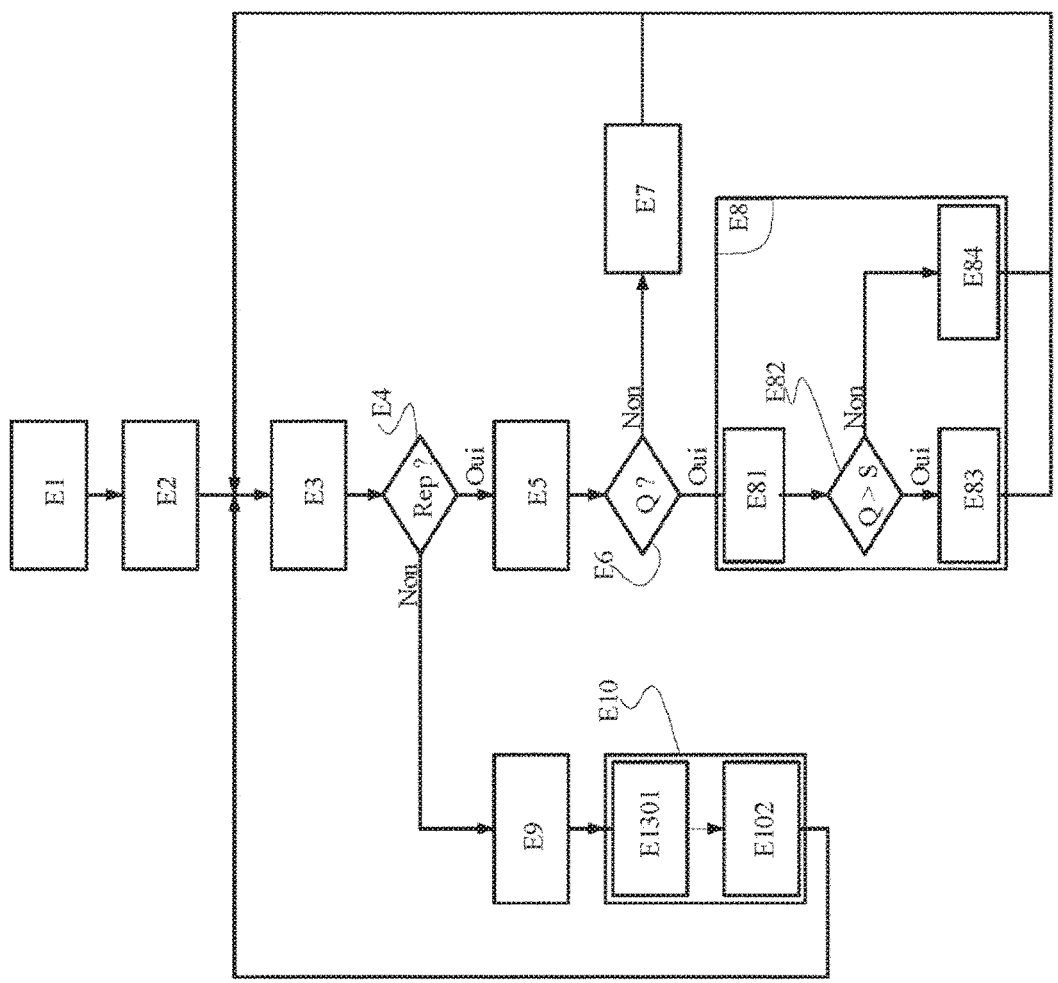
FIG. 3 is a diagram illustrating the steps which are carried out by an anti-collision apparatus of an anti-collision system according to an embodiment of the present invention.

FIG. 3 is a diagram illustrating the power control method which is carried out by an anti-collision apparatus 10 of an aircraft, such as the aircraft 1 of FIG. 1, according to the invention.

The step E1 is a step of initiating the tracking of an intruder aircraft, such as the aircraft 2 of FIG. 1. For example, this step E1 follows the reception by the anti-collision apparatus 10 of a beacon signal Sq, referred to as a squitter, transmitted by the aircraft 2 and the decision to consider this aircraft 2 to be an intruder aircraft to be tracked. This beacon signal Sq further contains the address of the transponder 20 of the aircraft 2.

This step E1 may initiate simultaneously a plurality of processes, such as the power control method of the invention, but also processes for studying trajectories leading to the transmission of Traffic Advisories (TAs) and/or Resolution Advisories (RAs). Only the power control method for the transmission of request messages to which the present invention relates is described here.

It will be appreciated that the whole of the power control method steps of the present invention forms an instance of a process for controlling the transmission power Pt of the request messages Req transmitted to an intruder aircraft 2 and that there are as many instances carried out at a given time as there are intruder aircraft at this time.

The step E2 is a step of initializing, on the one hand, the transmission power Pt of request messages Req at a maximum value Pmax and, on the other hand, a threshold quality value S described below.

The step E3 is a step of processing, for example, by the processing unit 13, and transmitting, for example, by the transmission channel 11 of the anti-collision apparatus 10, at the power Pt, radiofrequency signals which carry a request message Req towards the transponder 10.

The step E4 is a step of receiving a response message Rep to this request message Req.

If, in the step E4, a response message Rep transmitted by the transponder 20 has indeed been received (selection "yes"), there is carried out a step E5 of reading the response message Rep contained in this response and a step E6 of verifying that the message Rep read in this manner contains data relating to the quality of the radiofrequency signals previously received by the transponder 20. If this is not the case, like in the prior art, there is carried out a control step E7 for controlling the transmission power Pt of the next request message Req to be transmitted, such as:

$$Pt = P\max + 20 \, \mathrm{Log}(r/10)$$

r (range) being the distance which separates the aircraft 1 which is provided with the anti-collision apparatus 10 and the intruder aircraft 2 which is provided with the transponder 20. The control step E7 is followed by the step E3 of processing a new request message Req by the processing unit 13 and transmitting this message Req in the form of radiofrequency signals via the transmission channel 11. This loop by the control step E7 allows compatibility of the anti-collision system of the invention if the transponder 20 which responded to a request message Req is in accordance with the prior art and therefore does not implement the power control method according to the present invention.

If the message Rep read in the step E5 contains data relating to the quality of the radiofrequency signals received by the transponder 20 and measured by the measuring unit 25 thereof, there is carried out (for example, by the control unit 18 of FIGS. 2 and 5) a control step E8 for controlling the transmission power Pt of the radiofrequency signals which carry the request messages (Req) in accordance with the quality value(s) encapsulated in the response messages (Rep) transmitted by the transponder (20).

In the embodiment illustrated, the control step E8 comprises a step E81 of extracting the data relating to the quality value Q (step, for example, carried out by the decapsulation unit 17 of the anti-collision apparatus 10), then a step E82 of comparing this quality value Q with a threshold value S. By default, this threshold value S is a predetermined value which has been initialized in the step E2. As will be seen below, this threshold value S may be modified over time.

In the step E82, if the quality represented by the quality value Q is less than the quality represented by this threshold value S, there is carried out a step E83 of increasing the transmission power Pt of the next request message Req to be transmitted and, conversely, if it is greater than the quality represented by this threshold value S, there is carried out a step E84 of decreasing the transmission power Pt of the next request message Req to be transmitted.

Both steps E83 and E84 are followed by the step E3 of processing and transmitting a new request message Req.

If, at the step E4, no response to a request message Req previously transmitted by the anti-collision apparatus 10 has been received from the transponder 20 (selection "no"), for example, at the end of a predetermined time, there is carried out a step E9 of re-initializing the transmission power Pt at a value greater than the current value, for example, at the maximum power Pmax.

This step E9 makes it possible to solve the problem connected with the fact that an absence of any response from the transponder 20 may be a result of a deterioration of the transmission conditions between the aircraft 1 and the aircraft 2. Increasing the transmission power Pt to a greater value or even to the maximum power Pmax allows compensation for this deterioration and provides increased safety by promoting the re-establishment of contact with the intruder aircraft 2.

There may also be carried out a step E10, which is optional, of adjusting the threshold value S. This is because it may be the case that the threshold value S, which is predetermined in the initialization step E2, is too weak so that the transmission power Pt is too weak (the step E84 is carried out too often), which produces absences of any response to the request messages Req. The adjustment step E10 can solve this problem by increasing the threshold value S, for example in an incremental manner.

In the embodiment illustrated, the adjustment step E10 comprises a step E101 of establishing the frequency F of the absences of any response to the request messages Req and a step E102 of correcting the threshold value S in accordance with the frequency F established in the step E101, for example an increase in the threshold value in proportion to the frequency F.

The steps E9 and E10 are followed by the step E3 of processing and transmitting a new request message Req.

Figure 4:
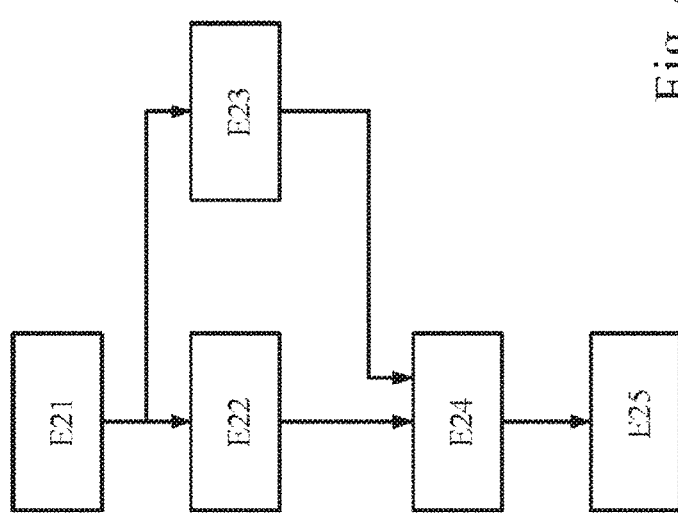
FIG. 4 is a diagram illustrating the steps which are carried out by a transponder of an anti-collision system according to an embodiment of the present invention.

FIG. 4 illustrates a diagram of the steps of the method of the invention which are carried out in a transponder 20 of an aircraft. The step E21 is a step of receiving the radiofrequency signals which carry a request message Req which is transmitted by an anti-collision apparatus of another aircraft. The step E22 is a step of processing a response message Rep.

The step E23 is a step of measuring the quality of the radiofrequency signals received in the step E21 which results in one or more quality value(s) Q (this step E23 is, for example, carried out in a measuring unit 25 of a transponder 10 according to FIG. 2). The step E24 is a step of encapsulation, in the response message Rep which is processed in the step E22, of data which represent the quality value(s) Q which is/are measured (this step E24 is, for example, carried out by the processing unit 26). The step 25 is a step of transmitting, in the form of radiofrequency signals, the response message Rep which results from the step E24 (this step E25 is, for example, carried out by a transmitter 23 of a transponder 20).

Figure 5:
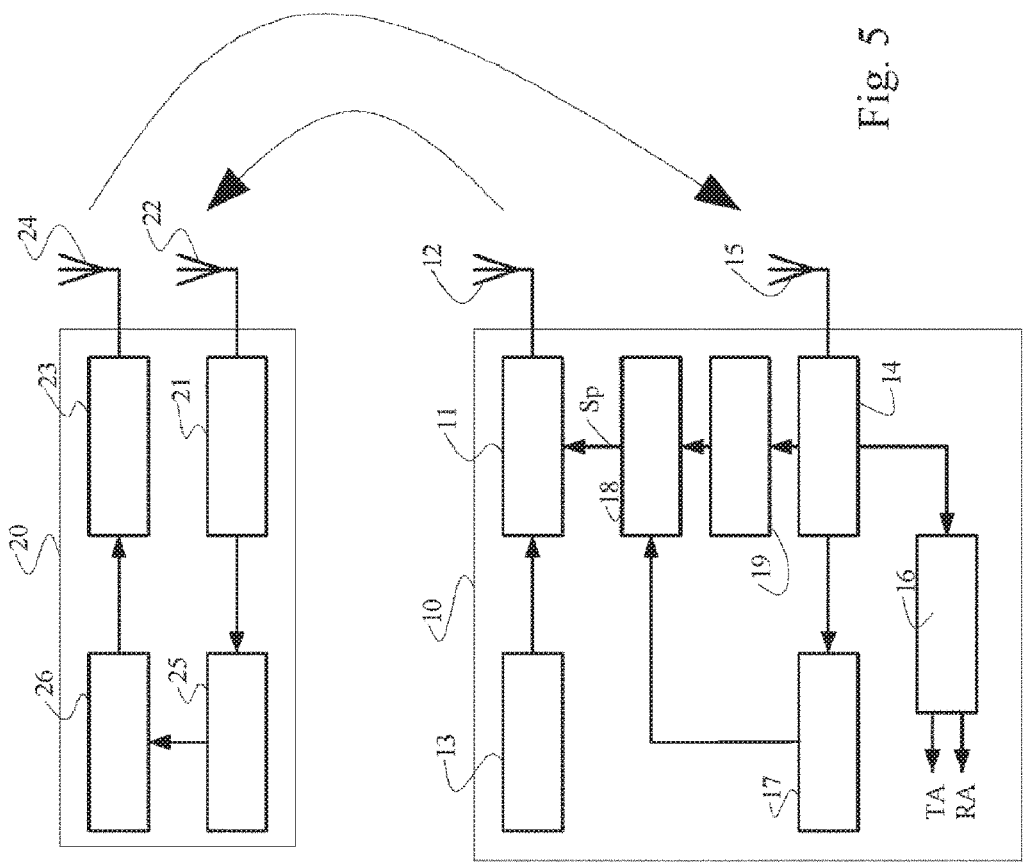
FIG. 5 is a schematic diagram of an anti-collision system according to a construction variant of the present invention.

FIG. 5 illustrates an anti-collision system according to the invention which differs from the one illustrated in FIG. 2 in that it comprises an establishing unit 19 for establishing aeronautical data which constitute parameters taken into consideration by the control unit 18, as will be seen below.

Figure 6:
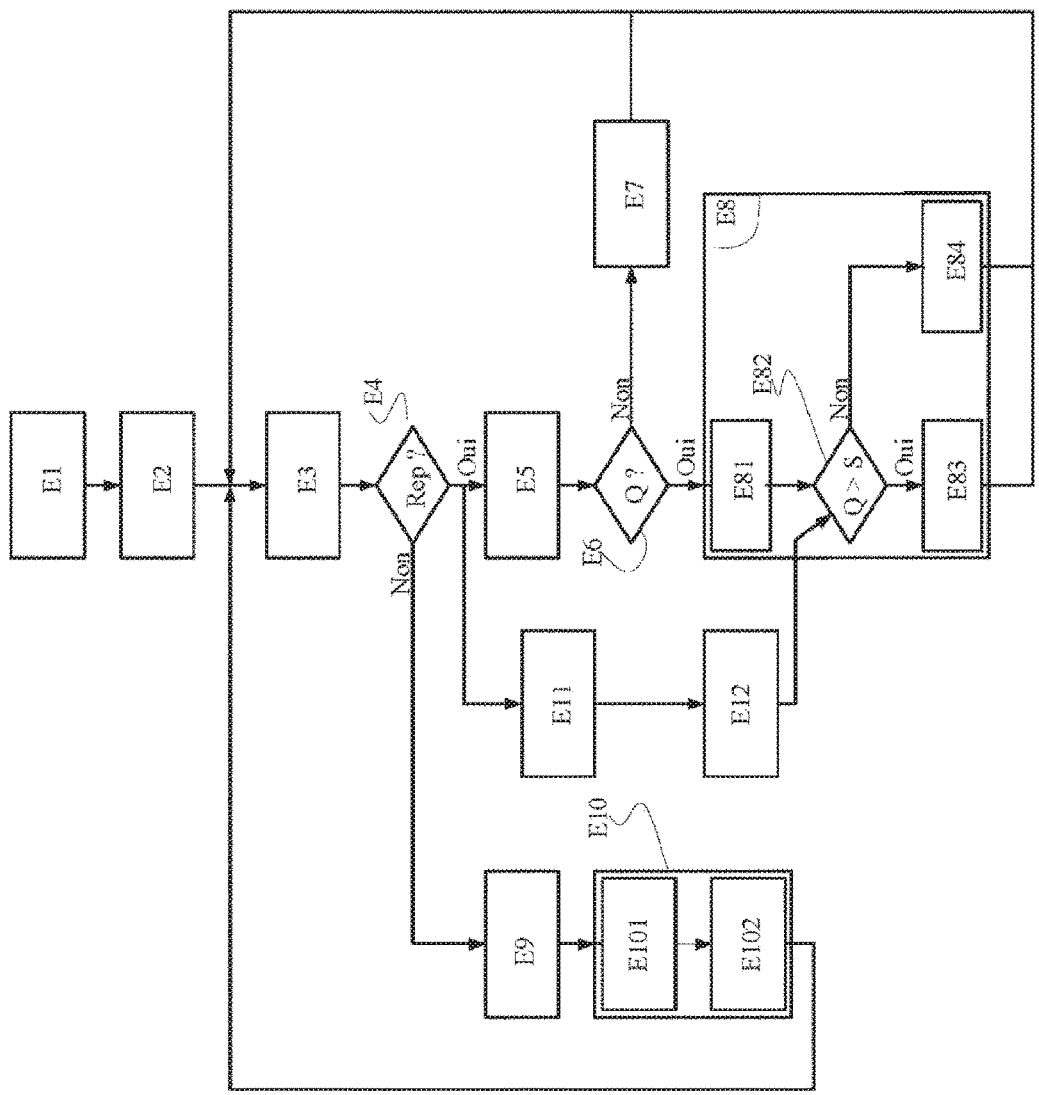
FIG. 6 is a diagram illustrating the steps which are carried out by an anti-collision apparatus of an anti-collision system according to the construction variant illustrated in FIG. 5.

A diagram of another embodiment of the method of the present invention is shown in FIG. 6. This method is, for example, carried out by the anti-collision apparatus 10 of FIG. 5. It differs from the one in FIG. 3 in that it further comprises steps of establishing the threshold value S which is subsequently taken into consideration in the control step E8, and in particular, in the embodiment illustrated, in the comparison step E82. On the basis of the response Rep received from the transponder 20, in conventional manner, there is carried out, for example, by the establishing unit 19 of the anti-collision apparatus 10 illustrated in FIG. 5, a step E11 of establishing aeronautical data, such as:

the time before collision Tau,
  the distance R (range) between the aircraft being considered and the intruder aircraft,
  the relative speed Rr (Range rate) defined as being the variation over time of the distance R,
  the precision of the bearing B defined as being the angle which the direction of the intruder aircraft and the heading of the aircraft being considered form, and
  the relative altitude and/or the derivative in relation to time of the relative altitude.

A step E12 is a step of modifying, in relation to a predetermined threshold value or the current threshold value, the threshold value S on the basis of at least one of the pieces of aeronautical data established in the step E11.

For example, if the quality of the radiofrequency signals considered is the power of reception by the transponder, the threshold value S can be decreased when:

the distance R decreases,
  the time before collision Tau decreases over time,
  the relative speed Rr increases,
  the bearing oscillates greatly on the navigation display ND,
  the relative altitude decreases or its derivative increases.

There results from the reduction of the threshold value a bearing of the power transmitted Pt because the step E84 is carried out more often.

Conversely, this threshold value can be increased when the distance R is greater than a predetermined distance, for example, 30 nm. There results from this increase of the threshold value a decrease of the power transmitted Pt because the step E83 is carried out more often.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling a transmission power of response request messages carried out by a TCAS system for preventing a collision of a first aircraft and a second aircraft, said system being of a type comprising an anti-collision apparatus with which said first aircraft is provided and a transponder with which said second aircraft is provided, said method comprising the following steps which are carried out by the anti-collision apparatus:

transmitting request messages in a form of radiofrequency signals which carry said messages, and receiving radiofrequency signals which carry response messages which are transmitted by said transponder in response to the request messages, said method further comprising the following steps which are carried out by said transponder:

receiving radiofrequency signals which carry request messages which are transmitted by said anti-collision apparatus, and transmitting radiofrequency signals which carry response messages in response to request messages, measuring at least one value, referred to as a quality value, of a variable which represents the quality of reception by a reception channel of the radiofrequency signals which carry request messages transmitted by the anti-collision apparatus, and encapsulating data which represent said at least one quality value in said response message and, a further step, carried out by said anti-collision apparatus:

controlling a transmission power of the radiofrequency signals which carry said request messages in accordance with the at least one quality value which is encapsulated in the response messages which are transmitted by said transponder, wherein the control step comprises:

comparing the quality value with a threshold value, increasing the transmission power of a next request message to be transmitted when a quality represented by the quality value is less than the quality represented by the threshold value, and decreasing the transmission power of the next request message to be transmitted when the quality represented by the quality value is greater than the quality of the threshold value, further comprising establishing aeronautical data and modifying the threshold value in accordance with values of said aeronautical data.

2. The method for controlling power as claimed in claim 1, wherein the quality value of the radiofrequency signal measured in the measuring step is the value of at least one of the following characteristics:

a reception power of the radiofrequency signals which carry a request message Req received by the transponder, a signal-to-noise ratio of the radiofrequency signal which carries a request message Req received by the transponder, or a bit error rate of the radiofrequency signal which carries a request message Req received by the transponder.

3. A method for controlling a transmission power of response request messages carried out by an anti-collision apparatus of a TCAS system to prevent a collision of a first aircraft and a second aircraft, said system being of a type comprising the anti-collision apparatus with which said first aircraft is provided and a transponder with which said second aircraft is provided, said method comprising the following steps:

transmitting request messages in a form of radiofrequency signals which carry said request messages, and receiving radiofrequency signals which carry response messages which are transmitted by said transponder in response to said request messages, and controlling a transmission power of the radiofrequency signals which carry said request messages in accordance with one or more quality values encapsulated in the response messages transmitted by said transponder, wherein the control step comprises:

comparing the quality value with a threshold value, increasing the transmission power of a next request message to be transmitted when a quality represented by the quality value is less than the quality represented by the threshold value, and decreasing the transmission power of the next request message to be transmitted when the quality represented by the quality value is greater than the quality of the threshold value, further comprising establishing aeronautical data and modifying the threshold value in accordance with values of said aeronautical data.

4. The method for controlling power as claimed in claim 3, further comprising a step of re-initializing the transmission power at a value greater than a current value if the receiving step does not receive any response to a request message previously transmitted by the anti-collision apparatus.

5. The method for controlling power as claimed in claim 4, wherein said re-initializing step re-initializes the transmission power at the maximum power.

6. The method for controlling power as claimed in claim 3, further comprising a step of adjusting the threshold value.

7. The method for controlling power as claimed in claim 6, wherein said adjusting step comprises establishing a frequency of absences of any response to the request messages and correcting the threshold value in accordance with the established frequency.

8. The method for controlling power as claimed in claim 3, further comprising controlling the transmission power of a next request message to be transmitted as:

$$Pt = P\max + 20 \, \text{Log}(r/10),$$

Pt being the transmission power, Pmax being a predetermined maximum power and r being a distance which separates the aircraft provided with the anti-collision apparatus and the aircraft which is provided with the transponder, said control step being carried out when the response message received does not contain data relating to the quality value of the radiofrequency signals previously received by said transponder.

9. The method for controlling power as claimed in claim 3, wherein said aeronautical data are at least one of the following:

a time before collision, a distance between the first aircraft and the second aircraft, a relative speed defined as being a variation over time of the distance, a precision of a bearing defined as being an angle between a direction of the second aircraft and a heading of the first aircraft, and a relative altitude of the first and second aircraft or the derivative thereof in relation to time.

10. The method for controlling power as claimed in claim 9, wherein the threshold value can be decreased when:

the distance between the first and second aircraft decreases, the time before collision decreases over time, the relative speed between the first and second aircraft increases, the bearing oscillates greatly on a navigation display, at least one of the relative altitude decreases or its derivative increases.

11. A method for controlling power carried out by a transponder of a first aircraft, comprising:

receiving the radiofrequency signals which carry a request message transmitted by a TCAS anti-collision apparatus of a second aircraft, processing a response message, the response message being usable by the TCAS anti-collision apparatus to determine a distance between the first aircraft and the second another aircraft, a relative speed between the first aircraft and the second aircraft, an estimated time before a possible collision, and an angle between a heading of the first aircraft and a direction of the second aircraft, measuring a quality of the radiofrequency signals received in the receiving step, encapsulating, in the response message processed in the processing step, data which represent a quality value Q which is measured, and transmitting, in the form of radiofrequency signals, the response message which results from the processing and encapsulating steps.

12. A TCAS system for preventing the collision of a first aircraft and a second aircraft, of the type comprising an anti-collision apparatus which is fitted to said first aircraft and a transponder which is fitted to said second aircraft, said anti-collision apparatus comprising:

a transmission channel for transmitting request messages in the form of radiofrequency signals which carry said messages and a receiver for receiving radiofrequency signals which carry response messages which are transmitted by said transponder in response to said request messages, said transponder comprising:

a reception channel for receiving radiofrequency signals which carry request messages which are transmitted by an anti-collision apparatus and a transmitter for transmitting radiofrequency signals which carry response messages in response to request messages, wherein said transponder comprises a measuring unit for measuring at least one value, referred to as a quality value, of a variable which represents the quality of reception by the reception channel of the radiofrequency signals which carry request messages which are transmitted by the anti-collision apparatus and an encapsulation unit for encapsulating said at least one quality value in said response message, and wherein said anti-collision apparatus comprises a control unit for controlling a transmission power of the transmission channel in accordance with the at least one quality value which is encapsulated in the response messages transmitted by said transponder, wherein the control step comprises:

comparing the quality value with a threshold value, increasing the transmission power of a next request message to be transmitted when a quality represented by the quality value is less than the quality represented by the threshold value, and decreasing the transmission power of the next request message to be transmitted when the quality represented by the quality value is greater than the quality of the threshold value, the control step further comprising establishing aeronautical data and modifying the threshold value in accordance with values of said aeronautical data.

13. The anti-collision apparatus of a system for preventing the collision of the first aircraft and the second aircraft as claimed in claim 12, said anti-collision apparatus comprising a transmission channel for transmitting request messages in the form of radiofrequency signals which carry said messages to the transponder of the second aircraft and the receiver for receiving radiofrequency signals which carry response messages which are transmitted by said transponder in response to said request messages, wherein said anti-collision apparatus comprises a control unit for controlling the transmission power of the transmission channel in accordance with the at least one quality values which is encapsulated in the response messages which are transmitted by said transponder.

14. The transponder of a system for preventing the collision of the first aircraft and the second aircraft as claimed in claim 12, said transponder comprising the reception channel for receiving radiofrequency signals which carry request messages which are transmitted by an anti-collision apparatus and a transmitter for transmitting radiofrequency signals which carry response messages in response to request messages, wherein the transponder comprises the measuring unit for measuring at least the at least one quality value of the variable which represents the quality of reception by the reception channel of the radiofrequency signals which carry request messages which are transmitted by the anti-collision apparatus and the encapsulation unit for encapsulating said at least one quality value in said response message.

* * * * *